June 3, 1969 B. SANTERAMO 3,447,530
READILY COLLAPSIBLE AND ASSEMBLABLE BARBECUE
Filed Nov. 1, 1967
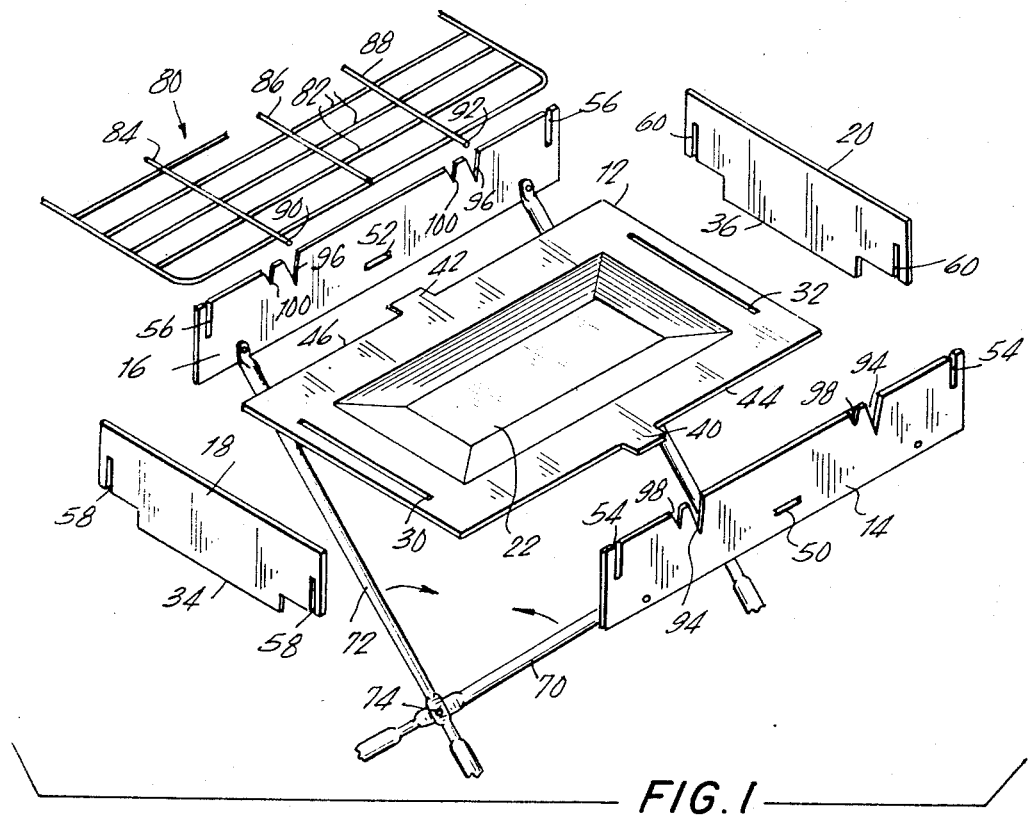
FIG. 1
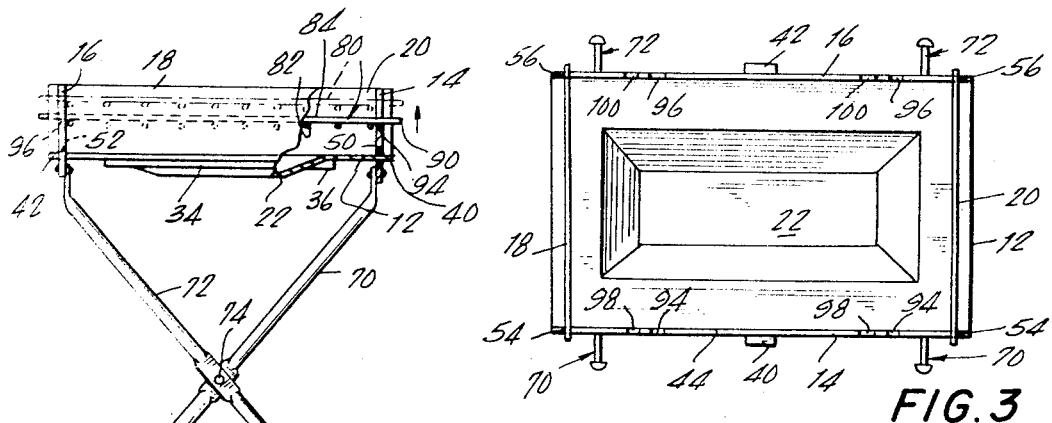
FIG. 2
FIG. 3
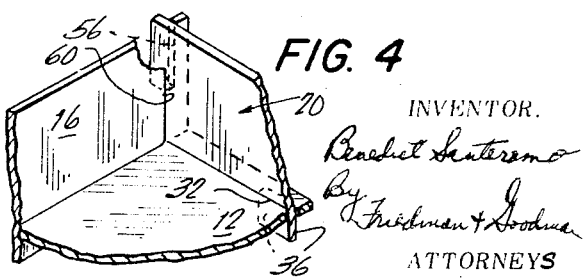
FIG. 4
INVENTOR.
Benedict Santeramo
By Friedman & Goodman
ATTORNEYS

United States Patent Office 3,447,530
Patented June 3, 1969

3,447,530
READILY COLLAPSIBLE AND
ASSEMBLABLE BARBECUE
Benedict Santeramo, 6032 75th St.,
Elmhurst, N.Y. 11373
Filed Nov. 1, 1967, Ser. No. 679,808
Int. Cl. F24b 3/00; A47j 37/07; F24c 1/16
U.S. Cl. 126—25    8 Claims

ABSTRACT OF THE DISCLOSURE

The invention is directed to a readily collapsible and assemblable barbecue comprising a charcoal retaining member having detachably engageable side and end walls, legs being mounted on the side walls which are pivotally adapted to collapse said side walls towards each other, or conversely, to spread said side walls apart when they are in the engaged position with said charcoal retaining member. A grill is also provided which is associatingly adapted, with said side walls, to be raised or lowered with relation to said charcoal retaining member.

BACKGROUND OF THE INVENTION

Field of the invention

This invention relates generally to an improved barbecue, and, more particularly to a barbecue which is adapted to be readily collapsible and assemblable.

Description of the prior art

Barbecues for outdoor cooking are, of course, well known. Equally well known is the difficulty encountered by the consumer in assembling the conventional barbecue, since they are rarely, if ever, available for purchase in the assembled condition. The more sophisticated barbecues present a myriad of parts, nuts and bolts and the like, not to speak of the complicated instructions accompanying the same. Of course, once assembled, after considerable effort, the prior art barbecues become substantially permanently assembled, presenting a storage problem, as well. Even in the simpler barbecues, or those that can be purchased assembled, e.g. floor models, the assembly is substantially a permanent one. Even if the consumer were to take the trouble to disassemble the aforementioned prior art barbecues, there is then remaining a multitude of parts, nuts, bolts, etc. which must be closely guarded from loss. Thus, like it or not, the barbecue becomes a permanent installation. It would therefore be of tremendous advantage if a barbecue could be provided which is truly readily collapsible and assemblable.

SUMMARY OF THE INVENTION

It is, therefore, among one of the principal objectives of this invention to provide an improved barbecue which is adapted to be readily collapsible and assemblable.

In accordance with the present invention, there is now provided a barbecue adapted to be readily collapsible and assemblable which comprises a charcoal retaining member in detachable engagement with a pair of opposing, parallel side and end walls, said end walls also detachably engaging said side walls, a pair of legs being mounted on each of said opposing side walls, in longitudinally spaced relationship, the resultingly opposingly disposed legs being joined in pivotal relationship, with the result that said side walls are adapted to collapse towards each other, when the barbecue is disassembled, or conversely, to spread said side walls apart when they are engaged by said charcoal retaining member. A grill is also provided which is associatingly adapted, with said side walls, to be raised or lowered with relation to said charcoal retaining member.

BRIEF DESCRIPTION OF THE DRAWING

The invention will be hereinafter more fully described with reference to the accompanying drawing, in which:

FIGURE 1 is an exploded view, in perspective, partially fragmentary, showing the various parts of the invention barbecue in detached relationship.

FIGURE 2 is a side elevational view of the invention barbecue and partially in cross-section.

FIGURE 3 is a top plan view of the barbecue in the assembled condition, without the grill.

FIGURE 4 is a fragmentary view, in perspective, of one corner formed by the detachable engagement of an end wall and a side wall.

DESCRIPTION OF THE PREFERRED EMBODIMENTS

Referring now to the figures of the drawing, for purposes of illustration, FIGURE 1 depicts the invention barbecue 10 in detached relationship. The barbecue 10 comprises a charcoal retaining member 12, of generally rectangular configuration, a pair of opposing, parallel side walls 14 and 16 and a pair of opposing, parallel end walls 18 and 20, said side and end walls also being of generally rectangular configuration, but smaller than said member 12. Charcoal retaining member 12 contains a recess 22, of generally rectangular configuration (it could also be round, or oval) for holding the charcoal to be burned therein, said charcoal not being shown. Slots 30 and 32 are provided in said charcoal retaining member 12, in parallel opposing, spaced longitudinal relationship, said slots 30 and 32 running in transverse fashion with respect to said member 12. End walls 18 and 20 are adapted to be detachably engaged by said charcoal retaining member 12 by means of slot engaging members 34 and 36 which fit in sliding associating relationship into slots 30 and 32, respectively. Slot engaging members 34 and 36 are each integrally respectively joined to end walls 18 and 20, along a longitudinal side thereof, and extend outwardly therefrom in vertical planar relationship, being of slightly smaller length than slots 30 and 32 into which they snugly fit. Tabular members 40 and 42 are centrally located on each longitudinal side 44 and 46, respectively, of the charcoal member 12, being integrally joined thereto and extending outwardly therefrom in horizontal planar relationship. Tabular members 40 and 42 are thus adapted to slidingly engage associated slots 50 and 52 provided in side walls 14 and 16, respectively. Side walls 14 and 16 are each provided with a pair of parallel, opposing grooves 54 and 56, respectively, in longitudinal spaced relationship. Complementary grooves 58 and 60 are provided in each of end walls 18 and 20, respectively, so that said end walls 18 and 20 are adapted to smoothly overlie side walls 14 and 16, and be in resulting detachable engagement therewith. This will readily be seen by referring to FIGURES 1 and 4. FIGURE 3 shows the relative positions of the end and side walls with respect to charcoal retaining member 12, when slot engaging members 34 and 36 are inserted into slots 30 and 32, respectively, and when grooves 58 and 60 complementarily overlie grooves 54 and 56 in side walls 14 and 16, respectively, said side walls 14 and 16 being slidingly engaged to charcoal member 12 by means of its tabular members 40 and 42 inserted into slots 50 and 52 thereof. Thus, it can be seen that when member 12, side walls 14 and 16, and end walls 18 and 20, are assembled, the resulting configuration is that of a shallow rectangular shaped open box.

A pair of legs 70 and 72 are respectively mounted by suitable means such as riveting to side walls 14 and 16, in longitudinally spaced relationship and in angular relationship to the vertical plane of said side walls. The legs 70 and 72 thus extend towards each other and are pivotally joined by means of pivot pins 74, that is each leg 70 is pivotally joined to each leg 72. In this fashion, thus, the side walls 14 and 16 are adapted to collapse towards each other, for easy storage, when the barbecue is disassembled, or conversely to spread apart when they are engaged by the charcoal member 12, as described hereinabove. Legs 70 and 72 are telescopically adjustable as shown in FIGURE 2 by the direction of the arrows, the lower portions 71, 73 thereof being inserted telescopically therein.

A grill 80, of generally rectangular configuration, is provided to fit inside of the assembled walls 14, 16, 18 and 20. Grill 80 has a series of ribs 82 running in a longitudinal direction and equally spaced apart, and three transverse ribs 84, 86 and 88, also equally spaced, one from the other. All of the ribs except 84 and 88 terminate at the sides of grill 80, ribs 84 and 88 having integral ends 90 and 92, respectively, which extend outwardly of the sides of grill 80, for a reason which will become apparent subsequently. Rib ends 90 and 92 are in registering relationship with notches provided therefor in side walls 14 and 16; notches 94 in side wall 14 and notches 96 in side wall 16. The height of grill 80 over charcoal member 12 may be made adjustable by providing shallower notches 98 and 100 in the respective side walls. For example, but not by way of limitation, notches 98 and 100 may be ½ the depth of notches 94 and 96. Notches 94 and 96 may be of a depth suitable to cause sufficient cooking heat to be provided to the grill portion of the barbecue. FIGURE 2 illustrates the grill 80 overlying the side walls 14 and 16 by means of the slots 94 and 96.

It can be seen that there has been provided a readily assemblable and collapsible barbecue. In order to collapse the same, referring again to FIGURES 1 and 2, all that need be done is to disengage slot engaging members 34 and 36 from slots 30 and 32, grooves 58 and 60 from grooves 54 and 56, thereby freeing side walls 18 and 20. Then slots 50 and 52 are disengaged from tabs 40 and 42, the member 12 drops out, and the side walls 14 and 16 can be collapsed toward each other, in the direction of the arrows (FIGURE 1), in an approximately vertical position. Conversely, in order to assemble the barbecue, the reverse procedure is followed. The barbecue components may be made of any suitable conventional metal such as steel, or the like. While charcoal has been described as the preferred fuel, it is to be understood that any solid fuel may be used therein such as wood, coal, etc.

Having thus described the invention as applied to a specific embodiment thereof, it is to be understood that various changes may be made by those skilled in the art without departing from the spirit and scope thereof.

What is claimed is:

1. A barbecue adapted to be readily collapsible and assemblable comprising a fuel retaining member, in detachable engagement with a pair of opposing, parallel side walls, and a pair of opposing, parallel end walls, said end walls also detachably engaging said side walls, a pair of legs being mounted on each of said opposing side walls in longitudinally spaced relationship, the resultingly opposingly disposed legs being secured in pivotal relationship, and a removable grill provided therefor.

2. A barbecue according to claim 1 wherein said fuel retaining member contains recessed fuel retaining means.

3. A barbecue according to claim 1 wherein tab means on said fuel member slidingly engage associatingly disposed slot means on said side walls, and slot means on said fuel member detachably receive associatingly disposed slot engaging means on said end walls.

4. A barbecue according to claim 1 wherein said end walls detachably engage said side walls by means of complementarily disposed groove means provided on said end and side walls.

5. A barbecue according to claim 1 wherein said grill is adapted to be raised or lowered with relation to said fuel retaining member.

6. A barbecue according to claim 5 wherein said grill is provided with a pair of transverse ribs having ends terminating outwardly of said grill, said ends being in registering relationship with notch means of varying depth provided in said side walls.

7. A barbecue according to claim 3 wherein said fuel retaining member is for charcoal and is substantially rectangular in configuration, said side and end walls being also of substantially rectangular configuration but smaller than said charcoal retaining member.

8. A barbecue according to claim 7 wherein said grill is adapted to fit inside the assembled end and side walls.

References Cited
UNITED STATES PATENTS

| | | | |
|---|---|---|---|
| 2,104,534 | 1/1938 | Wolff | 126—25 |
| 3,053,245 | 9/1962 | Beller. | |
| 3,249,101 | 5/1966 | Weissman et al. | 126—25 X |

FREDERICK KETTERER, *Primary Examiner.*

U.S. Cl. X.R.

126—9